Oct. 21, 1969 JAMES E. WEBB 3,474,192
ADMINISTRATOR OF THE NATIONAL AERONAUTICS
AND SPACE ADMINISTRATION
VIDEO COMMUNICATION SYSTEM AND APPARATUS

Filed Nov. 9, 1966 4 Sheets-Sheet 1

INVENTOR:
Henry Canvel
By Dwight Leslie
Glenn McCay
ATTORNEYS

Oct. 21, 1969 JAMES E. WEBB 3,474,192
ADMINISTRATOR OF THE NATIONAL AERONAUTICS
AND SPACE ADMINISTRATION
VIDEO COMMUNICATION SYSTEM AND APPARATUS
Filed Nov. 9, 1966 4 Sheets-Sheet 2

INVENTOR:
Henry Canvel

By

ATTORNEYS

INVENTOR:
Henry Canvel
By David E. Leslie
[signature]
ATTORNEYS

Oct. 21, 1969 JAMES E. WEBB 3,474,192

ADMINISTRATOR OF THE NATIONAL AERONAUTICS AND SPACE ADMINISTRATION

VIDEO COMMUNICATION SYSTEM AND APPARATUS

Filed Nov. 9, 1966 4 Sheets-Sheet 4

INVENTOR:
Henry Canvel

By David E. Leslie
J. Vern McCoy

ATTORNEYS 3,474,192
VIDEO COMMUNICATION SYSTEM AND APPARATUS

James E. Webb, Administrator of the National Aeronautics and Space Administration, with respect to an invention of Henry Canvel, La Canada, Calif.

Filed Nov. 9, 1966, Ser. No. 593,607
Int. Cl. H04n 5/76
U.S. Cl. 178—6.6 3 Claims

ABSTRACT OF THE DISCLOSURE

A real time, line-by-line half-tone printer for maintaining a slow-scan video communication system, including a multiplicity of displaceable type faces, each face having a cluster of a predetermined plurality of ordered, uniform half-tone printing protrusions arranged thereon, an operable worksheet platen and a type control mechanism connected within the video communication system adapted to drive the printing members and platen in a manner such that as a selected scene is viewed by an associated video system, video output signals provided thereby are employed by the control mechanism to drive the printing members and the platen for achieving line-by-line printing of order clusters of half-tone dots in a manner such that the scene is reproduced by a multiplicity of non-uniform clusters of half-tone dots which are uniformly spaced.

The invention described herein was made in the performance of work under an NASA contract and is subject to the provisions of Section 305 of the National Aeronautics and Space Act of 1958, Public Law 85–568 (72 Stat. 435; 42 USC 2457).

The present invention relates to an improved video communication system and apparatus of the teletypewriter type, or the like; and it relates more particularly to an improved video communication system and apparatus in which teletypewriter means is used either to originate the picture information or as a direct picture print out for received video information.

As is well known, the teletypewriter is an electromechanical device used to transmit or receive messages, for example, over the usual telegraph system. The teletypewriter performs two functions: (1) Its keyboard may be used to control the generation of correspondingly encoded electrical signals over the telegraph circuit; and (2) its control and typing units may be used effectively to convert received electrical signals into a printed or typed record.

The teletypewriter falls into two general categories: a first type which reproduces the printed message on a long narrow paper tape, and a second type which prints its message on successive lines of a page or "frame." The work sheet of the second type of teletypewriter may be a continuous roll of paper measuring, for example, eight and one-half inches wide. The present invention is primarily concerned with the latter type of teletypewriter, at least insofar as the direct line-by-line picture print-out of received video information is concerned.

The basic concept on which the improved video system and apparatus of the present invention is predicated is that of a system and apparatus in which the teletypewriter is adapted to respond to incoming video signals for the direct line-by-line reconstruction of a half-tone picture.

As is well known, half-tone pictures are formed by reproducing a picture with dots of various sizes and density. In photography the usual half-tone reproduction process includes a half-tone screen placed in front of a photographic film in a copying camera. In such an arrangement, those areas of high light intensity are passed through the screen essentially unimpaired causing small dots to be formed on the photographic plate. Lesser light intensities, on the other hand, are impeded proportionately, causing larger dots to be formed. In this manner, shades of gray (tones) may be produced and printed.

The half-tone picture forming process, as described briefly above, may be used to produce half-tone printing plates. The gradation of shading in the photograph is then reproduced by a system of graduated dots. These dots, as noted are formed by a screen, in which a network of perpendicular fine lines intersect one another, the screen being placed between the lens of the copying camera and the film negative.

The half-tone printing plate has a surface consisting of dot protrusions of various sizes uniformly placed, and it is capable of reproducing the highlights and shadows and all the gradations of tone in a continuous tone photograph. In relief and lithograph printing, the half-tone process uses the principle of variable dot areas and equal ink film thickness to produce a half-tone illustration.

The printing unit of the usual teletypewriter includes a plurality of printing members or "slugs." These slugs represent different printing characters, and they are selectively actuated to print out the received message on the work sheet. Each slug has an engraved surface pattern corresponding to the character to be printed on the work sheet when that particular slug is actuated.

In the practice of the present invention, the telewriter "slugs" have engraved patterns of dot protrusions on their respective type faces. These "dots" on the type faces are in the form of a pattern of protrusions which may be round, square, or any other form. The overall elemental area represented by the dot protrusions on the type face of each slug produces a corresponding gray tone, when that slug is actuated and caused to impact the ribbon of the teletypewriter.

The half-tone dots on the type faces in a constructed embodiment of the invention are symmetrically placed on a one-tenth inch by one-tenth inch area. Variation in dot size and spacing between the dots on the various slugs determine the shade of gray (tone) to be reproduced when that particular slug is actuated and impacted against the teletypewriter ribbon.

For example, "black" is reproduced in the constructed embodiment by a solid one-tenth inch square slug; while "white" is reproduced by operating the space bar of the teletypewriter instead of a printing member. The intermediate tones are represented by various dot sizes and densities on seven other type faces.

In the constructed embodiment, nine tones are represented, ranging from black to white in linear form. The printing member for each tone is actuated by a corresponding key on the keyboard of the machine, or by the control unit in accordance with a particular code read from the punched paper tape asociated with the machine. The various keys on the keyboard are labeled, for example, with respectively corresponding decimal numbers identifying the corresponding gray shade or tone.

Any desired degree of resolution, of course, can be achieved by selecting the number of printing members and keys, and by selecting a desired line density for the modified teletypewriter.

In the constructed embodiment referred to in the preceding paragraph, a model FDT–3 Friden Flexowriter was modified in accordance with the concepts of the invention. The FDT–3 Flexowriter accepts data on a bit-parallel and character-serial basis. It has a twelve-inch character, and it prints out ninety-five character/line, or ten characters/inch. The machine is equipped with a paper tape reader and a tape punch. It will operate at a speed of ten characters/second.

As is well known, when the Flexowriter is used, for example, in conjunction with a teletype line, the incoming signals on the line are in digital form, and are reproduced as coded punchings on a paper tape. This paper tape is then read by the reading mechanism of the machine, and the various printing members are correspondingly actuated, in accordance with the coded punchings on the tape.

It is usual to use the Baudot code in teletypewriter telegraphy. This code consists of five code pulses, any one of which may represent either a mark or a space. In single current signals used for operating most teletypewriters, a marking pulse is an interval of time during which current flows through the circuit and a spacing pulse is an interval of time during which no current flows. When the Baudot code is used to operate a teletypewriter, it is conventional for the five code pulses to be preceded by a start pulse which is always a spacing pulse, and to be followed by a rest, or stop pulse, which is always a marking pulse.

There are thirty-two possible combinations of the five code pulses in the Baudot code. Twenty-six combinations are respectively assigned to the twenty-six letters of the alphabet in the usual system. The blank combination, in which all five code pulses are spacing, is not normally used. The remaining five combinations are used for the following functions: (a) "Figure Shift" which causes the typing unit to shift to a position to print digits or punctuation marks; (b) "Letter Shift" which shifts the typing unit to a position to print letters; (c) "Carriage Return" which causes the printing carriage of a page machine to return from the right margin to the left margin at the end of a printed line; (d) "Line Feed" used on page machines which feeds the paper up one line after a line has been printed; (e) "Space" which causes the typing unit to space between words. Examples of the codes used in the teletypewriters telegraphy are shown in FIGURE 4.

It will be appreciated that a teletypewriter modified and adapted to the system and apparatus of the present invention will utilize, for example, a selected number of the above-listed code combinations respectively corresponding to various tones, instead of to letters and numbers. The system and apparatus of the invention will also normally use the code combinations mentioned above, with control carriage return, and line feed. Moreover, the system also uses the "space" code combination when a white tone is received, as mentioned above.

The system and apparatus of the present invention finds particular utility as a "quick-look" unit which is capable of printing out in real time, picture displays derived, for example, from a slow-scan digital television source. This source may, for example, be an interplanetary television probe.

For example, most interplanetary spacecraft include a television camera operating at slow-scan rates. The resulting television data is usually digitized by periodically sampling the analog video output and converting it, for example, into six bit binary words, respectively representing sixty-four video amplitude levels. These sixty-four video levels are sufficient to reproduce ten logarithmic shades of gray.

In accordance with usual present day practice, the aforesaid digitized data is then transmitted from the spacecraft at a rate of, for example, eight and one-third bits per second. With such a transmission rate, it requires about eight hours and thirty-five minutes to recover one full video frame. The data is demodulated from its carrier upon its receipt at the earth station, and encoded into, for example, the aforesaid Baudot code, for teletype transmission to the central processing station.

At the central station, a teletypewriter constructed in accordance with the concepts of the present invention, may be utilized to respond to the received Teletype data and thereby provide a direct real time print-out of the received picture data.

The aforesaid print-out may be made, for example, on the usual paper page type teletypewriter work sheet. However, it can also be made directly on a printing plate, for multilithograph-offset, or other printing.

An object of the present invention, therefore, is to provide an improved video communication system and apparatus in which the reliability, physical and electrical characteristics, capabilities, and universal acceptance of the teletypewriter are utilized to constitute a half-tone direct picture print-out unit.

Another object of the invention is to provide such an improved video communication system which is advantageous in that it utilizes digitized information which may be transmitted on narrow band communication channels. For example, the improved system and apparatus of the invention requires less band width than present day facsimile systems, so that narrow band transmission systems, such as intercontinental telephone lines, and the like, may be used advantageously.

Another object of the invention is to provide such an improved system and apparatus which is capable of providing a direct half-tone picture print-out on any appropriate recording medium, such as a paper work sheet, or directly on a multilithograph plate, or the like, for the offset or other printing of multiple copies of the reconstituted picture.

A more general object of the invention is to provide an improved system and apparatus for constructing picture or graphite material from digital input data, and particularly from data representative of slow scanning rates compatible, for example, with those of interplanetary television probes.

It should be noted, however, that the apparatus and system of the invention have general utility.

For example, the apparatus may be used in conjunction with a computer so that instead of pages of numbers being printed out in response to the computer output, a page of sequential half-tone patterns would be printed by the apparatus and system of the invention, having tones representing number levels.

For a format having sixty-four levels, for example, ten teletypewriter type faces would adequately show the trend of the data from the computer, and would clearly demonstrate gross errors that might be present in the data or the program. A computer output for a given program input could thereby be identified with increased facility by the apparatus and system of the invention, as well as any variations in output with a change of input data.

More generally, the improved system and apparatus of the invention may be used as a "quick-look" means for checking the calibration of any digital system. The apparatus has application, for example, in checking the program for photometric distortions in television pictures received from space probes, this being achieved before carrying out the entire data processing for the removal of distortions and for the enhancement of the picture. Therefore, by means of the apparatus of the invention, much time can be saved by discovering any program or calibration errors before the final high-definition photograph is processed through the computer system.

Another object of the invention, therefore, is to provide an improved video signal communication system and apparatus which is capable of directly constructing a half-tone picture, or other half-tone representations from the digital data output of computers, teletype systems, and other types of low frequency video communication systems using slow data scanning rates.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
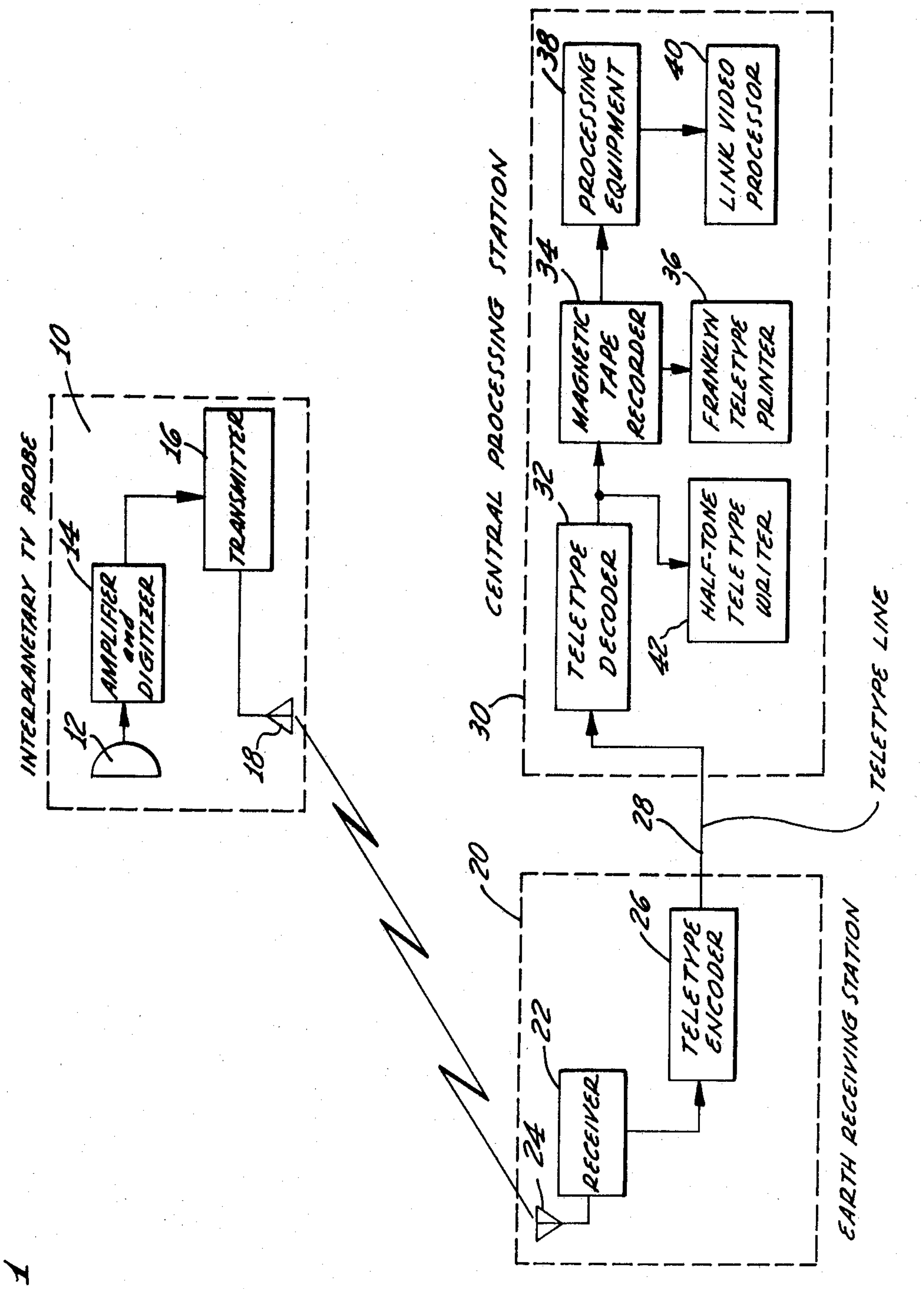
FIGURE 1 is an electro-optical system of the interplanetary television probe type which may be used for gathering video information and transmitting the information to earth, and which may incorporate the apparatus and concepts of the present invention.

In the system of FIGURE 1, an interplanetary television probe is represented by a rectangle 10. The probe includes, for example, a television camera 12 which is electrically connected to an amplifier and digitizer 14. The output of the unit 14 is applied to a transmitter 16, and is radiated to earth over an antenna 18.

As mentioned previously, the television camera 12 is directed at the scene to be televised, such as the surface of a planet, and is operated at a relatively slow scan rate. The resulting television data from the camera 12 is digitized in the unit 14. This is achieved, for example, by periodically sampling the analog video signal derived from the camera 12, and by converting the sampled signal into digital six-bit binary words. These words, as mentioned previously, can represent, for example, any one of sixty-four video levels. As also mentioned, these sixty-four discrete video levels are sufficient to reproduce ten logarithmic shades (tones) of gray.

The digitized data from the unit 14 is modulated on an appropriate carrier in the transmitter 16, and is transmitted to an earth receiving station 20. As also mentioned, this transmission may take place at the rate of 8⅓ bits per second which requires, for example, about eight and one-half hours for the earth station 20 to recover one full frame of video.

The earth station includes a typical receiver 22 which is connected to a receiving antenna 24. The antenna 24 intercepts the signal from the transmitting antenna 18, and the signal is amplified and demodulated in the receiver 22. The resulting digital output from the receiver 22 is applied to a Teletype encoder 26. The encoder encodes the signal, for example, into the aforesaid Baudot code for transmission over the usual Teletype line 28 to a central processing station 30, such as Space Flight Operations Facility.

The central processing station 30 includes a Teletype decoder 32 which serves to decode the incoming Teletype data, the decoded data being recorded on a magnetic tape recoder 34. The recorded data may be displayed, for example, on a Franklyn Teletype printer 36 in the form of decimal numbers, for a quick look at the data.

For ultimate reproduction, the magnetic tape recording on the recorder 34 is processed in non-real time in the processing equipment 38 to produce an element matrix print-out. The processing equipment 38 may include another magnetic tape recorder which is used by a Link Video Processor 40 to produce a film image. The Link Video Processor, for example, may produce a 12 x 12 millimeter film of each frame of the scene scanned by the television camera 12.

The system and components shown in FIGURE 1 and referred to above are presently known to the art of interplanetary video communication systems. Therefore, it is believed that a more detailed description of the equipment need not be presented herein.

It should be observed that the processing time for the Link Video Processor to produce a film image after the receipt of a video frame by the central processing station 20 is approximately five hours. In the practice of the present invention, a half-tone teletypewriter 42, constructed to incorporate the concepts of the invention, may be coupled to the output of the Teletype decoder 32, so as to provide a real-time half-tone print-out of all picture data, word-by-word at the incoming data rate. This provides, as mentioned above, a quick-look capability for the data received from the television probe 10.

As mentioned above, the television camera 12 scans the scene to be televised at a slow scanning rate, and on a line-by-line basis for each video frame. As an end result, the Link Video Processor 40 produces a separate picture for each video frame.

As also mentioned, transmission of the video data is effectuated by digitizing the analog video signal from the camera 12 as each line is scanned. This digitizing causes the video shade values during the scanning of each line to be converted into a series of binary numbers. These numbers are received in sequence by the central processing station 30, so that the picture may be reconstituted.

Figure 2:
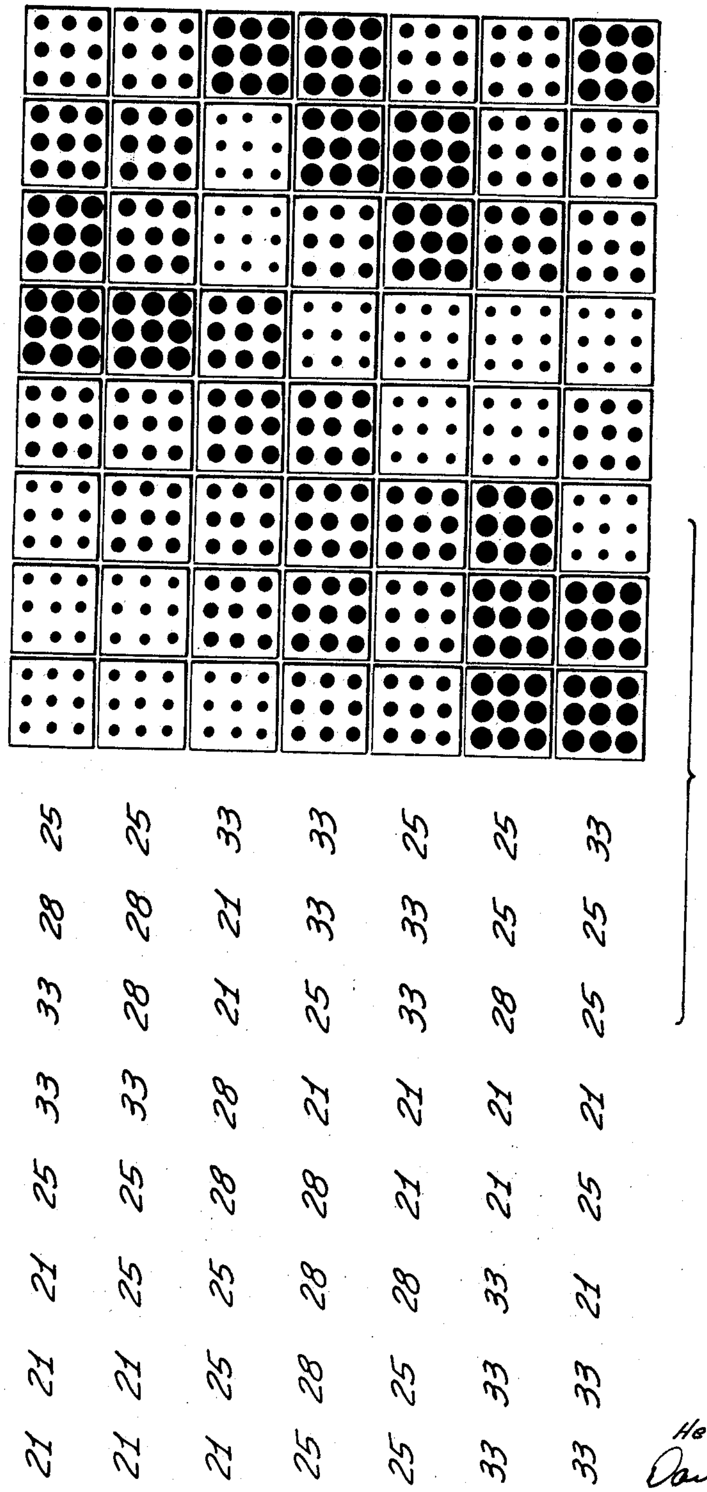
FIGURE 2 is a table and chart showing the actual type faces formed to carry out the concepts of the invention, and the manner in which different decimal numbers may be related to half-tone keys and to the type faces in the teletypewriter apparatus of the invention.

For example, and as shown in the left hand portion of the chart of FIGURE 2, a series of binary signals are received, representing different binary numbers, as each line of the scene is scanned by the television camera. The decimal equivalents of a typical series for a typical frame is shown in the chart of FIGURE 2. These numbers would be displayed, for example, by the Franklyn Teletype printer 36.

In accordance with the present invention, and as will be described in more detail subsequently, the paper tape control for the half-tone teletypewriter 42 is punched by the Teletype code corresponding, for example, to the decimal numbers shown in the chart of FIGURE 2. The paper tape is then read by the paper tape reader of the teletypewriter, and selected keys are controlled, so that their associated printing members may be driven against the ribbon so as to form the corresponding imprint on the work sheet.

Also, and as mentioned above, the various type faces or slugs, are formed with dot protrusions of different sizes, these being shown, for example, on the right hand side of the chart of FIGURE 2.

Therefore, as the paper tape is read by the control unit of the teletypewriter, different slugs are caused to be actuated. This results in a line-by-line recording of the incoming information which, in turn, results in a direct representation in half-tone form of the picture being received at that particular time.

Figure 3:
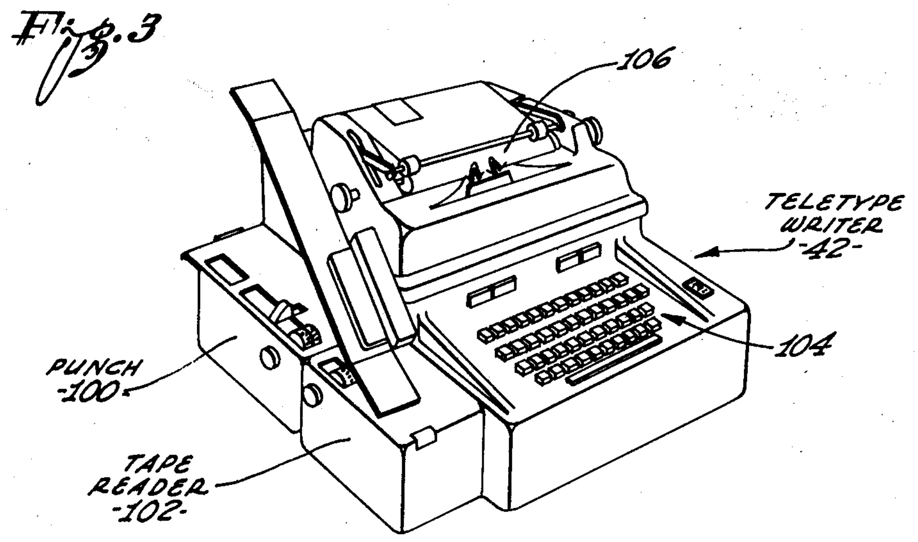
FIGURE 3 is a perspective view of a teletypewriter modified to incorporate the concepts of the invention.

A typical teletypewriter, modified in accordance with the concepts of the present invention, is illustrated in FIGURE 3.

The teletypewriter 42, as shown in FIGURE 3 includes, for example, a punch unit 100 which responds to the incoming signals derived from the unit 32 to provide a corresponding punched record on a paper tape. The paper tape is subsequently read by a tape reader 102 associated with the machine, and the information read from the tape is used to actuate corresponding keys on the keyboard 104. These keys, in turn, control their corresponding printing members, so that a record appears on the work sheet 106 associated with the teletypewriter. This record appears, as apparent from the chart of FIGURE 2, as a series of half-tone dot clusters. These clusters are typed onto the paper on a line-by-line basis until a complete video frame has been reproduced as a half-tone picture on the work sheet.

In modifying the keyboard of an existing machine, in the construction of one embodiment of the invention, and as mentioned briefly above, eight character printing members were removed from the machine and replaced with the special half-tone printing members having type faces such as shown in FIGURE 2. As mentioned, a "black" was reproduced in the constructed embodiment by a near solid one-tenth inch square slug, while a "white" elemental area was reproduced by actuating the space bare 200 of the keyboard (FIGURE 4).

Figure 4:
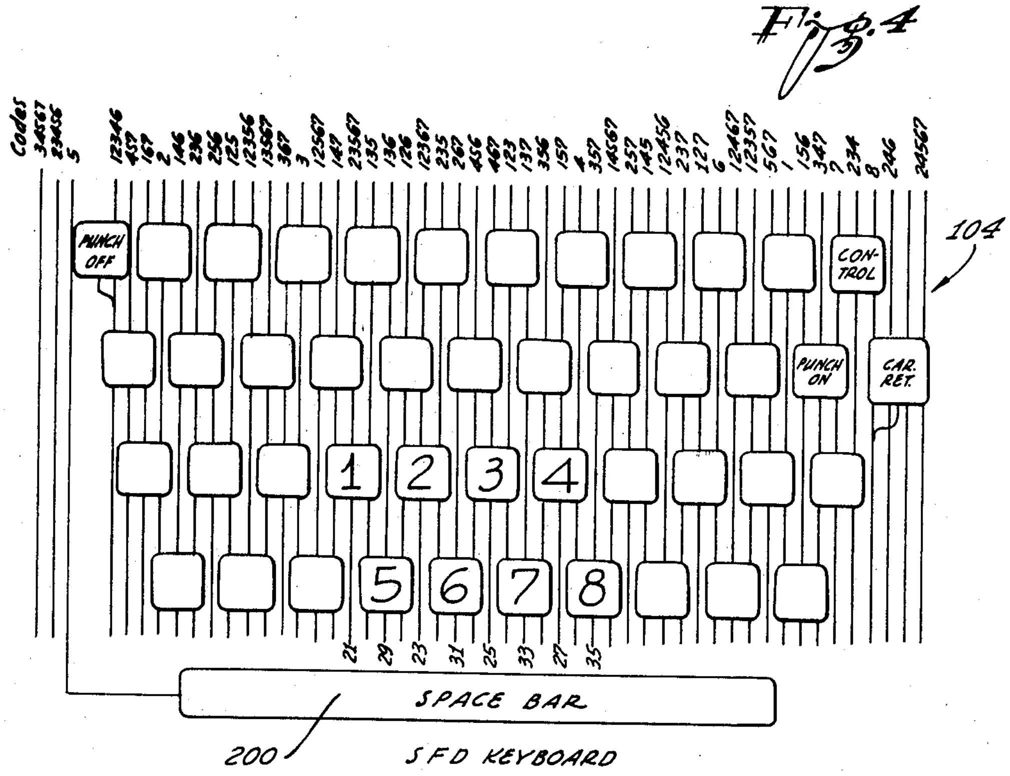
FIGURE 4 is a schematic representation of the keyboard of the teletypewriter of FIGURE 3.

Thus, nine tones are realized with eight keys, identified as keys 1–8 in FIGURE 4. The other keys were not used, except for the "carriage return" key. As is understood in the teletypewriter art, these keys are controlled by the reading of the punched paper tape by the tape reader 102.

In this manner, the various half-tone slugs are actuated so as to produce the desired half-tone picture. At the end of each line, the "Carriage Return" key is operated. This may be accompanied by a one line advance of the work sheet 106, or a separate "line feed" control may be used for that purpose. As also indicated, the space bar 200 is operated whenever a "white" tone is desired.

In the actual construction of the particular embodiment referred to above, in which an FDT–3 Friden Flexowriter was modified, modification of the line feed mechanism was necessary in order that the line feed movement would be precisely in one-tenth inch increments, so as to correspond with the selected one-tenth by one-tenth inch format of the half-tone type faces. This modification was achieved by replacing the platen ratchet wheel of the original machine with a ratchet wheel 300 (FIGURES 6A and 6B), and by precise adjustment of the ratchet pawl assembly 302. That is, in order to achieve the desired line spacing, the standard thirty-three tooth ratchet wheel was replaced by a fifty-five tooth ratchet 300 in the particular embodiment. This was found to provide the desired one-tenth inch line spacing in the modified machine.

Figures 6A, 6B:
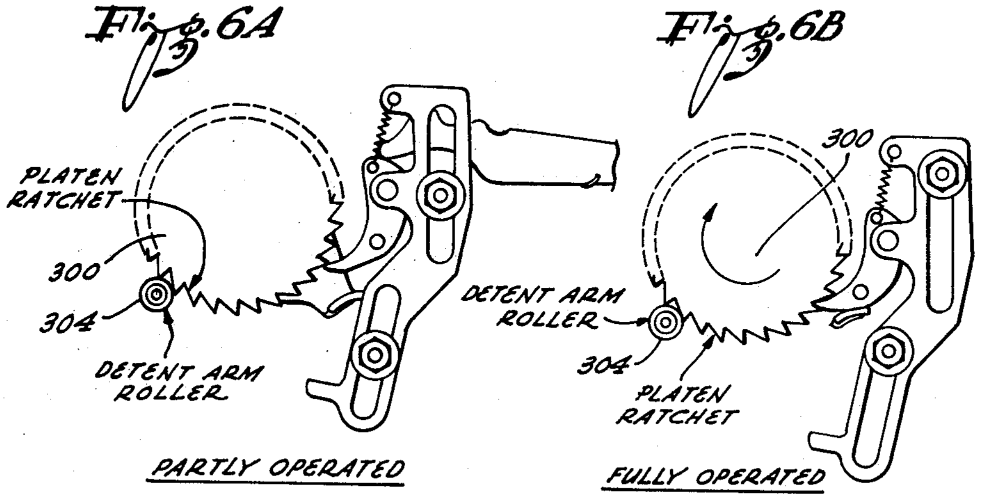
FIGURES 6A and 6B show other operating components of the teletypewriter, which, likewise, were modified in the constructed embodiment of the invention.

It will be appreciated that when the work sheet 106 of FIGURE 3 is to be advanced one line, the ratchet pawl assembly 302 is first moved to its partly operated position of FIGURE 6A, and then released and spring biased to its fully operated position of FIGURE 6B. The latter operation causes the pawl to turn the platen ratchet from one position of the detent arm roller 304 to the next, so that the work sheet may be advanced to the next line.

Figure 5:
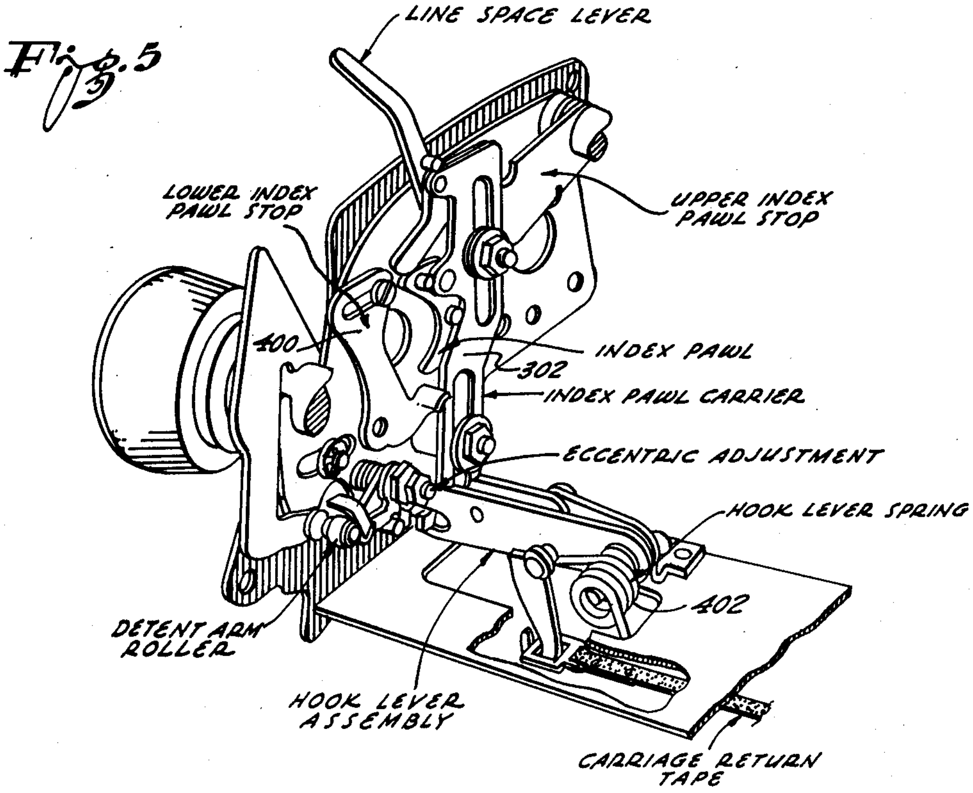
FIGURE 5 is a fragmentary perpsective view of a portion of the operating mechanism of the teletypewriter of FIGURE 3, showing various components which were modified in a constructed embodiment of the invention.

Moreover, and as shown in FIGURE 5, the lower index pawl stop 400 was made heavier in the modified apparatus than in the standard machine, so as to permit the platen to index ten lines per inch for the desired half-tone reproduction, as compared with the usual standard of six or eight lines per inch. By the same token, the tension of the hook lever spring 402 was increased to insure proper operation of the machine at ten lines per inch.

Other changes included substituting nylon rollers for the original rubber paper tension rollers, and the installation of a hard platen on the machine to provide the proper impression of the half-tone slugs on the paper.

Further details of the particular machine are believed superfluous insofar as the present specification is concerned, since these are standard, and are published in the Friden manual accompanying the aforesaid model number.

It should be pointed out, of course, that the constructed embodiment of the invention referred to herein was merely utilized to show the feasibility of the invention. For commercial applications, increased and more acceptable resolution may be achieved by decreasing the type size from one-tenth inch square referred to above to, for example, one-fourteenth inch square. This would be accompanied, of course, by a corresponding change in the ratchet wheel of the line advancing mechanism. Also, the number of tones could be increased, for example, from nine to eighteen (or other number) for correspondingly increased resolution.

Moreover, a teletypewriter having a twenty inch carriage could be utilized to advantage, thereby increasing the packing density, for example, to 280 words per line. In addition, symmetrical and random half-tone dot patterns could be used separately or inter-changeably.

The invention relates, therefore, to an electro-optical information communication and half-tone read-out system whereby picture information, particularly interplanetary, may be scanned at a slow rate, and the video intelligence thereby acquired converted at a slow data rate to digital picture information; the picture information being subsequently printed out on a direct real time basis as a half-tone reproduction by means of a half-tone teletypewriter.

The teletypewriter, as described herein, employs a plurality of keys, each provided with a type face or "slug," and each type face having a plurality of raised dot protuberances. The protuberances of each type face vary in area size and density in gradations of 1–10, for example, in order that half-tones may be produced by the keys. In the described manner, half-tone reproductions of the scanned scene are reproduced by the teletypewriter.

It will be appreciated that while a particular embodiment of the system and apparatus of the invention has been described, modifications may be made. It is intended in the claims to cover all modifications which fall within the scope of the invention.

For example, when the teletypewriter 42 of FIGURE 3 is used in a transmission system, the manual actuation of the keyboard 104 causes the corresponding code characters to be punched out on the paper in the punch 100.

The punched paper is subsequently read so that the punchings may be transformed into appropriate electrical signals complying, for example, with the Baudot code. These signals are received at a distant receiving station and used to control a half-tone teletypewriter thereat, in the manner described above.

What is claimed is:

1. In a real time video communication system of the type including a slow-scan television camera adapted to view a selected scene and provide video output signals, a signal digitizer and a signal transmitter adapted to digitize and transmit the video output signals as digitized intelligence, and a receiver and signal processor adapted to receive and decode the digitized intelligence to provide decoded output signals to a magnetic tape recorder for accommodating a recording thereof; a line-by-line, halftone printer connected with the signal processor including:

(A) a worksheet registering means for registering a worksheet within the printer;

(B) a printing unit for printing on a registered worksheet including a plurality of operable half-tone printing members of a uniform size and shape, each member including an ordered cluster of half-tone dot-shaped printing protrusions spaced at a center-to-center spacing common to all clusters and of a predetermined cross sectional dimension differing from that of the protrusions of the other members of the plurality of members; and (C) a control unit connected between the signal processor and the printer adapted to receive and employ the decoded output signals to selectively drive the printing members and the registering means in real time to provide on the registered worksheet a real time, half-tone reconstruction of the selected scene.

2. The printer according to claim 1 wherein the control unit includes means for actuating the printing members to successively apply the clusters of half-tone dots to the worksheet in longitudinal and lateral side-by-side alignment in a manner such that a common center-to-center spacing is maintained between the half-tone dots of the clusters applied to the worksheet.

3. The printer according to claim 2 wherein the worksheet registering means includes a worksheet advancing platen having a platen ratchet adapted to advance the worksheet in line-by-line increments at a line spacing equal to the common spacing established for the center-to-center spacing of the dots of the members, whereby the common center-to-center spacing is maintained for all half-tone dots applied to the worksheet.

References Cited

UNITED STATES PATENTS

| | | | |
|---|---|---|---|
| 1,777,622 | 10/1930 | O'Hare | 197—1 |
| 2,824,903 | 2/1958 | Zimmermann | 178—5 |

OTHER REFERENCES

A. Benington—Transmission of Photographs by Radio—Radio News, August 1922—p. 230.

ROBERT L. GRIFFIN, Primary Examiner

JOSEPH A. ORSINO, Jr., Assistant Examiner

U.S. Cl. X.R.

178—5, 6, 6.8; 197—1